United States Patent
Kobayashi et al.

(10) Patent No.: US 11,654,955 B2
(45) Date of Patent: May 23, 2023

(54) VEHICLE AND CONTROL APPARATUS OF VEHICLE

(71) Applicant: HONDA MOTOR CO., LTD., Tokyo (JP)

(72) Inventors: Takuma Kobayashi, Wako (JP); Yoshifumi Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 210 days.

(21) Appl. No.: 17/145,628

(22) Filed: Jan. 11, 2021

(65) Prior Publication Data

US 2021/0221425 A1    Jul. 22, 2021

(30) Foreign Application Priority Data

Jan. 16, 2020    (JP) .............................. JP2020-005393

(51) Int. Cl.
  *B62D 1/28*    (2006.01)
  *B60W 40/06*    (2012.01)
  *B60W 40/08*    (2012.01)

(52) U.S. Cl.
  CPC ............. *B62D 1/286* (2013.01); *B60W 40/06* (2013.01); *B60W 40/08* (2013.01); *B62D 1/283* (2013.01);
  (Continued)

(58) Field of Classification Search
  CPC ....... B62D 1/286; B62D 1/283; B60W 40/08; B60W 40/06; B60W 2552/20; B60W 2540/225; B60W 2540/223
  See application file for complete search history.

(56) References Cited

U.S. PATENT DOCUMENTS 9,592,850 B1 *   3/2017   Kataoka ............... B62D 15/025
10,427,686 B2 *  10/2019  Mimura ............... B60W 30/182
(Continued)

FOREIGN PATENT DOCUMENTS

JP    2017-165289 A    9/2017
JP    2018-27726 A    2/2018
(Continued)

OTHER PUBLICATIONS

Office Action dated May 28, 2021, issued in counterpart JP application No. 2020-005393, with partial English translation. (8 pages).

*Primary Examiner* — Peter D Nolan
*Assistant Examiner* — Wae L Louie
(74) *Attorney, Agent, or Firm* — WHDA, LLP (57) ABSTRACT

A control apparatus of a vehicle including a steering operator is provided. The control apparatus includes an environment detection unit configured to detect a surrounding environment of the vehicle, a travel control unit configured to execute automatic steering control based on the surrounding environment, and an operation detection unit configured to detect a first operation and a second operation by a driver. The travel control unit can take a first state in which automatic steering control is not performed, a second state in which automatic steering control is performed on condition of the second operation, and a third state in which automatic steering control is performed without condition of the second operation. The travel control unit transitions from the third state to the first state on condition of the first operation.

9 Claims, 3 Drawing Sheets

(52) U.S. Cl.
CPC . *B60W 2540/223* (2020.02); *B60W 2540/225* (2020.02); *B60W 2552/20* (2020.02)

(56) References Cited

U.S. PATENT DOCUMENTS

| | | | |
|---|---|---|---|
| 10,558,213 B2* | 2/2020 | Sato | B60W 60/0053 |
| 2017/0174258 A1* | 6/2017 | Yamada | B62D 6/08 |
| 2017/0313320 A1* | 11/2017 | Asakura | B60R 25/1012 |
| 2019/0278267 A1 | 9/2019 | Honda | |
| 2019/0300014 A1* | 10/2019 | Nagase | B60K 35/00 |
| 2019/0385459 A1* | 12/2019 | Mizoguchi | G08G 1/163 |
| 2022/0161848 A1* | 5/2022 | Cascajar Ordonez | B62D 1/283 |
| 2022/0234599 A1* | 7/2022 | Tsuji | B60W 50/0205 |
| 2022/0297599 A1* | 9/2022 | Kajiwara | B60W 40/08 |

FOREIGN PATENT DOCUMENTS

| | | |
|---|---|---|
| JP | 2019-001350 A | 1/2019 |
| JP | 2019-155956 A | 9/2019 |
| JP | 2019-175208 A | 10/2019 |
| JP | 2019-177762 A | 10/2019 |
| JP | 2019-215730 A | 12/2019 |

* cited by examiner

VEHICLE AND CONTROL APPARATUS OF VEHICLE

This application claims priority to and the benefit of Japanese Patent Application No. 2020-005393 filed on Jan. 16, 2020, the entire disclosure of which is incorporated herein by reference.

BACKGROUND OF THE INVENTION

Field of the Invention

The present disclosure relates to a vehicle and a control apparatus of the vehicle.

Description of the Related Art

Automated driving that does not require a driver to grip the steering wheel has been put to practical use. Japanese Patent Laid-Open No. 2018-27726 proposes to switch from automated driving that does not require the driver to grip the steering wheel to manual driving via a state of gripping the steering wheel.

A case will now be considered in which automated driving that does not require gripping of the steering wheel is switched to manual steering by merely gripping the steering wheel. With such a method, if the driver is already gripping the steering wheel during the automated driving that does not require gripping of the steering wheel, the automated driving may switch to manual steering without the driver being aware of the switching. This is also true in the case of switching from automated driving that does not require peripheral monitoring by the driver to manual steering.

SUMMARY OF THE INVENTION

The disclosure provides a technique for appropriately switching to manual steering from automated driving which does not require a specific action by the driver. According to one aspect, a control apparatus of a vehicle including a steering operator, the control apparatus comprising: an environment detection unit configured to detect a surrounding environment of the vehicle; a travel control unit configured to execute automatic steering control based on the surrounding environment; and an operation detection unit configured to detect a first operation and a second operation by a driver; wherein the travel control unit can take a first state in which automatic steering control is not performed, a second state in which automatic steering control is performed on condition of the second operation, and a third state in which automatic steering control is performed without condition of the second operation, and the travel control unit transitions from the third state to the first state on condition of the first operation is provided.

DESCRIPTION OF THE EMBODIMENTS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Figure 1:
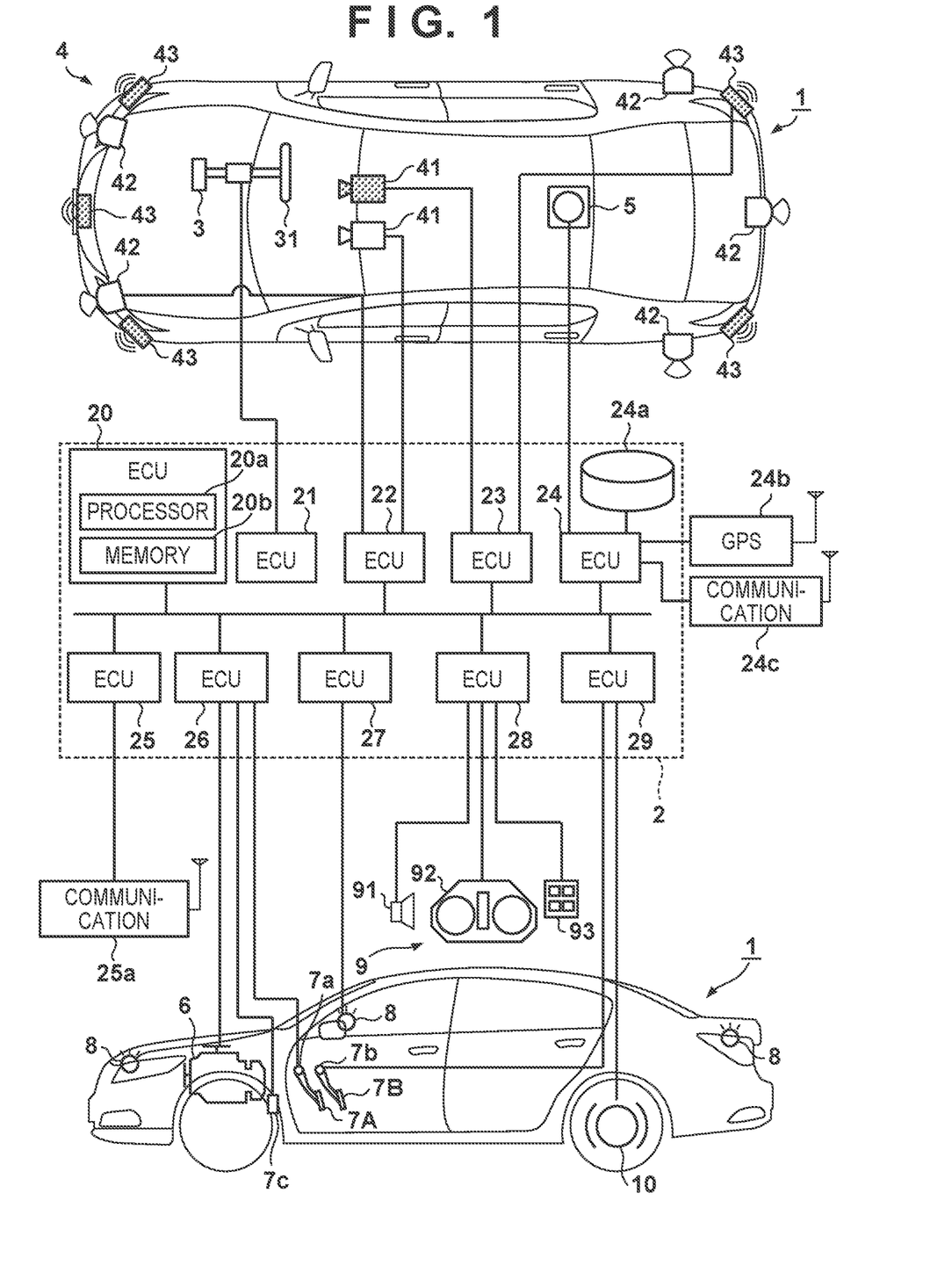
FIG. 1 is a block diagram illustrating a configuration example of a vehicle according to an embodiment.

FIG. 1 is a block diagram illustrating a vehicle 1 according to an embodiment of the disclosure. In FIG. 1, the vehicle 1 is schematically illustrated in a plan view and a side view. The vehicle 1 is, for example, a sedan type four-wheel passenger car. The vehicle 1 may be such a four-wheeled vehicle, or may be a two-wheeled vehicle, or any other type of vehicle.

The vehicle 1 includes a vehicle control apparatus 2 (hereinafter simply referred to as a control apparatus 2) for controlling the vehicle 1. The control apparatus 2 includes multiple ECUs 20 to 29 communicably connected to each other via an in-vehicle network. Each ECU includes a processor represented by a CPU, a memory such as a semiconductor memory, and an interface to an external device. The memory stores programs executed by the processor and data used for processing by the processor. Each ECU may include multiple processors, memories, interfaces, etc. For example, the ECU 20 includes a processor 20a and a memory 20b. The processor 20a executes commands included in a program stored in the memory 20b to execute processing by the ECU 20. Alternatively, the ECU 20 may include a dedicated integrated circuit, such as an ASIC, for executing the processing by the ECU 20. This is also the same for the other ECUs.

The functions and the like assigned to the ECUs 20 to 29 will now be described. Note that the number of ECUs and the assigned functions can be appropriately designed, and be more segmented or more integrated than those in this embodiment.

The ECU 20 executes control related to automated driving of the vehicle 1. In automated driving, at least one of steering and acceleration/deceleration of the vehicle 1 is automatically controlled. In the control example described below, both steering and acceleration/deceleration are automatically controlled.

The ECU 21 controls an electric power steering device 3. The electric power steering device 3 includes a mechanism for steering the front wheels in accordance with a driving operation (a steering operation) of a steering wheel 31 by the driver. The electric power steering device 3 includes a motor for exerting a driving force for assisting the steering operation and automatically steering the front wheels, a sensor for detecting a steering angle, etc. When the vehicle 1 is in an automated driving state, the ECU 21 automatically controls the electric power steering device 3 in response to an instruction from the ECU 20 to control the traveling direction of the vehicle 1.

The ECUs 22 and 23 control detection units 41 to 43 that detect the surrounding conditions of the vehicle and perform information processing of the detection results. The detection units 41 are cameras for capturing images of the front of the vehicle 1 (hereinafter, also referred to as cameras 41). In the case of this embodiment, the detection units 41 are fixed to the vehicle 1 at the front portion of the roof on the vehicle interior side of the front windshield. Through analysis of images captured by the cameras 41, it is possible to extract the contours of objects and the demarcation lines (white lines, etc.) of lanes on the road.

The detection units 42 are light detection and ranging (LiDAR) systems (hereinafter, also referred to as LiDARs 42). The detection units 42 detect objects in the surroundings of the vehicle 1 and measure the distances to the objects. In this embodiment, five LiDARs 42 are provided: one at each front corner of the vehicle 1, one at the rear center of the vehicle 1, and one on each rear side of the vehicle 1. The detection units 43 are millimeter-wave radars (hereinafter, also referred to as radars 43). The detection units 43 detect targets in the surroundings of the vehicle 1 and measure the distances to the targets. In this embodiment, five radars 43 are provided: one at the front center of the vehicle 1, one at each front corner of the vehicle 1, and one at each rear corner of the vehicle 1.

The ECU 22 controls one of the cameras 41 and each of the LiDARs 42 and performs information processing of the detection results. The ECU 23 controls the other camera 41 and each of the radars 43 and performs information processing of the detection results. Since two sets of devices for detecting the surrounding conditions of the vehicle are provided, the reliability of the detection result can be improved. Furthermore, since different types of detection units, such as cameras, LiDAR systems, and radars, are provided the surrounding environment of the vehicle can be analyzed multidimensionally.

The ECU 24 controls a gyro sensor 5, a GPS sensor 24b, and a communication device 24c and performs information processing of the detection results or the communication results. The gyro sensor 5 detects rotary motion of the vehicle 1. The course of the vehicle 1 can be determined on the basis of the detection results of the gyro sensor 5, the wheel speed, etc. The GPS sensor 24b detects the current position of the vehicle 1. The communication device 24c performs wireless communication with a server providing map information and traffic information, and acquires the map information and the traffic information. The ECU 24 can access a database 24a of map information constructed in a memory. The ECU 24 searches a route from the current location to a destination. The ECU 24, the map database 24a, and the GPS sensor 24b constitute a so-called navigation device.

The ECU 25 includes a communication device 25a for inter-vehicle communication. The communication device 25a performs wireless communication with other vehicles in the vicinity and exchanges information with the vehicles.

The ECU 26 controls a power plant 6. The power plant 6 is a mechanism for outputting a driving force for rotating the driving wheels of the vehicle 1, and includes, for example, an engine and a transmission. The ECU 26, for example, controls the output of the engine in response to a driving operation (an accelerator operation or an acceleration operation) by the driver detected by an operation detection sensor 7a provided on an accelerator pedal 7A, or switches the gear ratio of the transmission on the basis of information such as the vehicle speed detected by a vehicle speed sensor 7c. When the vehicle 1 is in an automated driving state, the ECU 26 automatically controls the power plant 6 in response to an instruction from the ECU 20 and controls the acceleration/deceleration of the vehicle 1.

The ECU 27 controls lamps (headlights, tail lights, etc.) including direction indicators 8 (turn signals). In the example of FIG. 1, the direction indicators 8 are disposed on the front portion, the door mirrors, and the rear portion of the vehicle 1.

The ECU 28 controls an input/output device 9. The input/output device 9 outputs information to the driver and accepts information input from the driver. A voice output device 91 announces information to the driver by voice. A display device 92 announces information to the driver by displaying an image. The display device 92 is disposed, for example, on the surface of the driver's seat and constitutes an instrument panel or the like. Note that, although voice and display are provided as examples here, information may also be announced by vibration or light. Moreover, the information may be announced by any combination of two or more of voice, display, vibration, and light. Moreover, the combination and/or the announcement mode may differ depending on the level (for example, degree of urgency) of the information to be announced. An input device 93 is a group of switches disposed at positions that allow operation by the driver to give instructions to the vehicle 1. The input device 93 may further include a voice input device.

The ECU 29 controls a brake device 10 and a parking brake (not illustrated). The brake device 10 is, for example, a disk brake device disposed on each wheel of the vehicle 1 to decelerate or stop the vehicle 1 by applying resistance to the rotation of the wheels. The ECU 29 controls the activation of the brake device 10 in response to a driving operation (a brake operation) by the driver detected by the operation detection sensor 7b disposed on the brake pedal 7B. When the vehicle 1 is in the automated driving state, the ECU 29 automatically controls the brake device 10 in response to an instruction from the ECU 20 to control the deceleration and stop of the vehicle 1. The brake device 10 and the parking brake can also be activated to maintain the stopped state of the vehicle 1. When the transmission of the power plant 6 includes a parking lock mechanism, the parking lock mechanism may be activated to maintain the stopped state of the vehicle 1.

Figure 2:
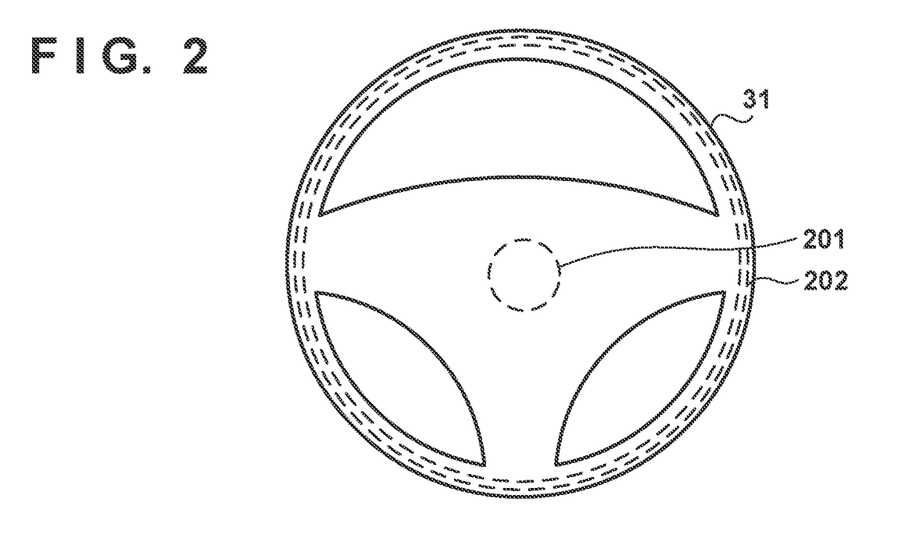
FIG. 2 is a schematic diagram illustrating a configuration example of a steering wheel according to an embodiment.

A configuration example of the steering wheel 31 will now be described in detail with reference to FIG. 2. The steering wheel 31 is an example of a steering operator for the driver to perform steering. A torque sensor 201 and a touch sensor 202 are mounted on the steering wheel 31. The torque sensor 201 is a sensor for detecting torque applied to the steering wheel 31. The control apparatus 2 can detect a turning operation of the steering wheel 31 by the driver on the basis of an output from the torque sensor 201. The control apparatus 2 can also determine the turning amount of the steering wheel 31 on the basis of an output from the torque sensor 201. The touch sensor 202 is a sensor for detecting contact to the steering wheel 31. The control apparatus 2 can detect a gripping operation of the steering wheel 31 by the driver on the basis of an output from the touch sensor 202.

Figure 3:
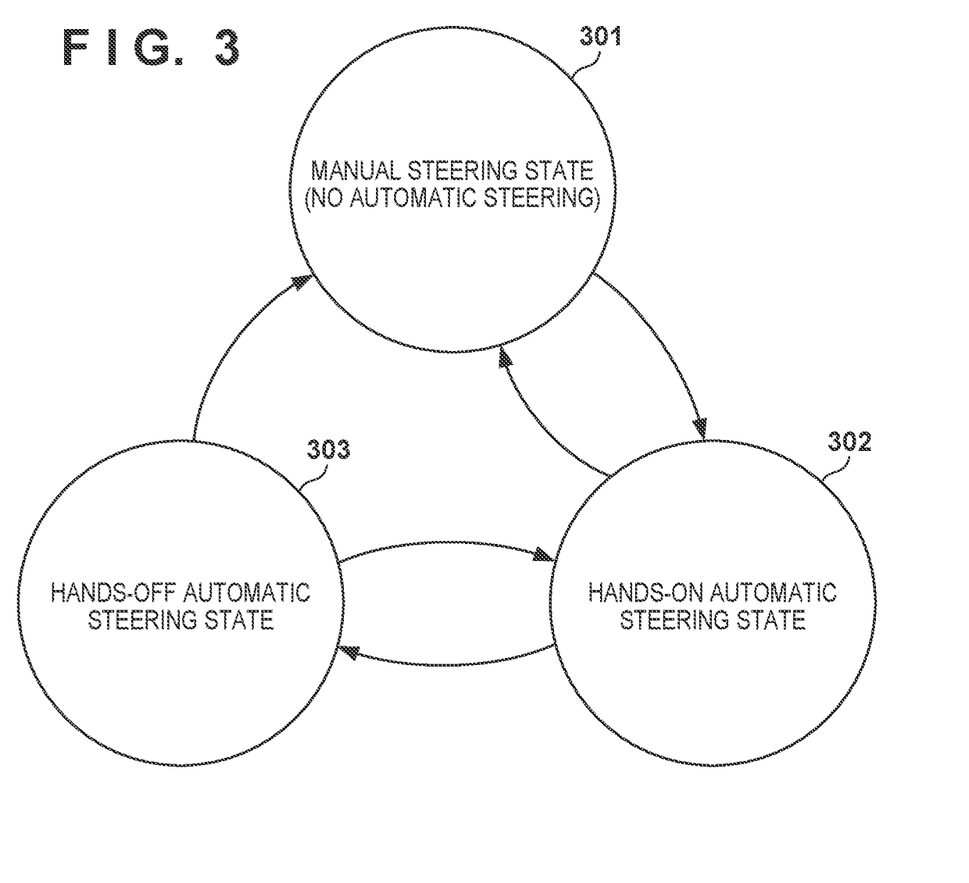
FIG. 3 is a state transition diagram illustrating examples of states of a control apparatus according to an embodiment.

States of travel control that can be taken by the control apparatus 2 will now be described with reference to FIG. 3. In this embodiment, the control apparatus 2 can take a manual steering state 301, a hands-on automatic steering state 302, and a hands-off automatic steering state 303. The control apparatus 2 may also take any state other than these three states.

The manual steering state 301 is a state in which the driver performs manual steering. In this state, the control apparatus 2 does not perform automatic steering control. The manual steering state 301 may be divided into a substate in which the control apparatus 2 automatically controls acceleration and deceleration (for example, adaptive cruise control (ACC)) and a substate in which the driver manually performs acceleration and deceleration.

In the hands-on automatic steering state 302, the control apparatus 2 performs automatic steering control on the condition that the driver is gripping the steering wheel 31. The control apparatus 2 detects the surrounding environment of the vehicle 1 on the basis of the outputs from the detection units 41 to 43, and can execute the automatic steering control on the basis of the surrounding environment. The control apparatus 2 may perform the automatic steering control to implement, for example, a lane keeping assist system (LKAS) or lane change. The automatic steering control may or may not be used in combination with the automatic acceleration/deceleration control.

In the hands-off automatic steering state 303, the control apparatus 2 performs automatic steering control without the condition that the driver is gripping the steering wheel 31. The content of the automatic steering control in the hands-off automatic steering state 303 may be the same as that in the hands-on automatic steering state 302, or may differ only in whether or not a driver is obliged to grip the steering wheel 31.

When the control apparatus 2 in the manual steering state 301 should transition to automatic steering control (for example, when an instruction to start automated driving is provided by the driver and the surrounding environment allows automated driving), the control apparatus 2 transitions to the hands-on automatic steering state 302. When automatic steering control cannot be continued in the hands-on automatic steering state 302, the control apparatus 2 transitions to the manual steering state 301. When the driver is no longer obliged to grip the steering wheel 31 (for example, when the speed of the vehicle 1 falls to a threshold speed or below) in the hands-on automatic steering state 302, the control apparatus 2 transitions to the hands-off automatic steering state 303. When the automatic steering control cannot be continued in the hands-off automatic steering state 303, the control apparatus 2 transitions to the manual steering state 301. When the driver becomes obliged to grip the steering wheel 31 (for example, when the speed of the vehicle 1 increases to a threshold speed or more) in the hands-off automatic steering state 303, the control apparatus 2 transitions to the hands-on automatic steering state 302.

An example of an operation method of the control apparatus 2 in the hands-off automatic steering state 303 will now be described with reference to FIG. 4. The operation for when the control apparatus 2 is in the manual steering state 301 or the hands-on automatic steering state 302 may be the same as that of an existing method. Thus, the description thereof is omitted. The operation of FIG. 4 may be processed by a processor (for example, the processor 20a) of the control apparatus 2 executing a program stored in a memory (for example, the memory 20b). Alternatively, some or all of the operation of FIG. 4 may be executed by a dedicated circuit (for example, an application specific integrated circuit (ASIC) or a field programmable gate array (FPGA)).

In step S401, the control apparatus 2 determines whether or not to switch to the manual steering state 301. If the control apparatus 2 should be switched to the manual steering state 301 ("YES" in step S401), the control apparatus 2 causes the processing to transition to step S402, and in any other case ("NO" in step S401), causes the processing to transition to step S407. The criterion for determining that the state should be switched to the manual steering state 301 may be an existing criterion. For example, when the vehicle 1 travels from a highway to a general road, the control apparatus 2 may determine that the state should be switched to the manual steering state 301.

In step S402, the control apparatus 2 determines whether or not the steering wheel 31 has been gripped during the determination in step S401. If the steering wheel 31 has been gripped ("YES" in step S402), the control apparatus 2 causes the processing to transition to step S403, and in any other case ("NO" in step S402), causes the processing to transition to step S409.

In step S403, the control apparatus 2 determines the turning threshold used in subsequent step S405. How the turning threshold is used and determined will be explained below. Step S403 may be executed at any timing before step S405.

In step S404, the control apparatus 2 requests the driver to perform a turning operation of the steering wheel 31. This request may be made by, for example, displaying a message on the display device 92 or playing a message from the voice output device 91.

In step S405, the control apparatus 2 determines whether or not the turning amount of the turning operation by the driver exceeds a turning threshold. If the turning amount exceeds the turning threshold ("YES" in step S405), the control apparatus 2 causes the processing to transition to step S406, and in any other case ("NO" in step S405), causes the processing to transition to step S411. The turning threshold used in step S405 is the turning threshold determined in step S403.

If the hands-off automatic steering state 303 is transitioned to the manual steering state 301 only on the condition that the steering wheel 31 is gripped, there is a risk of the state transitioning to the manual steering state 301 without the driver noticing while the driver is already gripping the steering wheel 31. Therefore, in this embodiment, the hands-off automatic steering state 303 is transitioned to the manual steering state 301 on the condition of the turning operation of the steering wheel 31. In particular, in this embodiment, when it is determined that the hands-off automatic steering state 303 should be transitioned to the manual steering state 301 while the driver is gripping the steering wheel 31, the hands-off automatic steering state 303 is transitioned to the manual steering state 301 on the condition of the turning operation of the steering wheel 31. In this way, the control apparatus 2 can accurately determine that the driver has started the manual steering intentionally.

The turning threshold used in step S405 (that is, the turning threshold determined in step S403) may be a constant value regardless of the situation. Alternatively, the control apparatus 2 may determine the turning threshold on the basis of the shape of the road on which the vehicle 1 is traveling when it is determined that the hands-off automatic steering state 303 should be transitioned to the manual steering state 301. For example, when the curvature of the road shape is large, the control apparatus 2 may increase the turning threshold in comparison to that when the curvature is small. When the vehicle 1 is traveling on a straight road, the intention of steering should be confirmable through a small turning amount because it is difficult for the driver to operate the steering wheel 31 so as to increase the turning amount.

In step S406, the control apparatus 2 switches its own state to the target state. If the target state has been determined to be the manual steering state 301 in step S401, the control apparatus 2 switches from the hands-off automatic steering state 303 to the manual steering state 301 in step S406.

If the driver does not respond to the request of the turning operation in step S404, and step S405 is determined to be "NO," the control apparatus 2 performs alternative control in step S411. For example, the alternative control may be control for stopping the vehicle 1 at a safe place.

In the description above, a case is described in which it is determined that the state should be transitioned to the manual steering state 301 while the driver is gripping the steering wheel 31. In the following, a case is described in which it is not determined that the state should be transitioned to the manual steering state 301 in step S401.

In step S407, the control apparatus 2 determines whether or not to transition to the hands-on automatic steering state 302. If the control apparatus 2 should transition to the hands-on automatic steering state 302 ("YES" in step S407), the control apparatus 2 causes the processing to transition to step S408, and in any other case ("NO" in step S407), causes the processing to transition to step S401. In any other case, the control apparatus 2 should transition to neither the manual steering state 301 nor the hands-on automatic steering state 302 and thus continues the hands-off automatic steering state 303.

In step S408, the control apparatus 2 determines whether or not the driver is gripping the steering wheel 31. If the driver is gripping the steering wheel 31 ("YES" in step S408), the control apparatus 2 causes the processing to transition to step S406, and in any other case ("NO" in step S408), causes the processing to transition to step S409. If the driver is already gripping the steering wheel 31, the condition for the transition to the hands-on automatic steering state 302 is already satisfied. Therefore, the control apparatus 2 transitions to the hands-on automatic steering state 302 in step S406. At this time, the control apparatus 2 may announce to the driver that the state has transitioned to the hands-on automatic steering state 302.

In step S409, the control apparatus 2 requests the driver to perform a gripping operation of the steering wheel 31. This request may be made by, for example, displaying a message on the display device 92 or playing a message from the voice output device 91.

In step S410, the control apparatus 2 determines whether or not the driver has gripped the steering wheel 31. If the steering wheel 31 has been gripped ("YES" in step S410), the control apparatus 2 causes the processing to transition to step S406, and in any other case ("NO" in step S410), causes the processing to transition to step S411. When the driver grips the steering wheel 31, the control apparatus 2 transitions to the hands-on automatic steering state 302 in step S406 because the condition for the transition to the hands-on automatic steering state 302 is already satisfied. If the driver does not respond to the request of a gripping operation in step S409, and step S410 is determined to be "NO," the control apparatus 2 performs alternative control in step S411.

In this way, the control apparatus 2 sets gripping of the steering wheel 31 as the condition for the transition from the hands-off automatic steering state 303 to the hands-on automatic steering state 302. The control apparatus 2 does not request a turning operation because even if the state transitions to the hands-on automatic steering state 302 without the intention of the driver, the automatic steering state is maintained.

Described below is a case in which it is determined that the state should be transitioned to the manual steering state 301 while the driver is not gripping the steering wheel 31. In this case, step S402 is determined to be "NO," and the processing transitions to step S409. If the driver is not gripping the steering wheel 31, the driver can be prompted to grip the steering wheel 31 to confirm the intent of the driver to perform steering by himself or herself. Therefore, the control apparatus 2 transitions to the manual steering state 301 on the condition of the gripping operation and not the turning operation. Alternatively, if it is determined that the control apparatus 2 should transition to the manual steering state 301 while the driver is not gripping the steering wheel 31, the state may be transitioned to the manual steering state 301 on the condition of a turning operation.

In the above-described embodiment, the case in which the hands-off automatic steering state 303 is transitioned to the manual steering state 301 or the hands-on automatic steering state 302 has been described. Alternatively, the disclosure may be applied to a case in which an eyes-off automatic steering state is transitioned to a manual steering state or an eyes-on automatic steering state. The eyes-on automatic steering state is a state in which the control apparatus 2 performs automatic steering control on the condition that the driver performs peripheral monitoring (looking outside of the vehicle 1). The eyes-off automatic steering state is a state in which the control apparatus 2 performs automatic steering control without the condition that the driver performs peripheral monitoring. The control apparatus 2 may transition the eyes-off automatic steering state to the manual steering state on the condition that the driver performs a gripping operation or a turning operation of the steering wheel 31. The control apparatus 2 may transition the eyes-off automatic steering state to the eyes-on automatic steering state on the condition that the driver performs a peripheral monitoring operation. Other aspects are the same as those described above in relation to the operation of the steering wheel 31.

Figure 4:
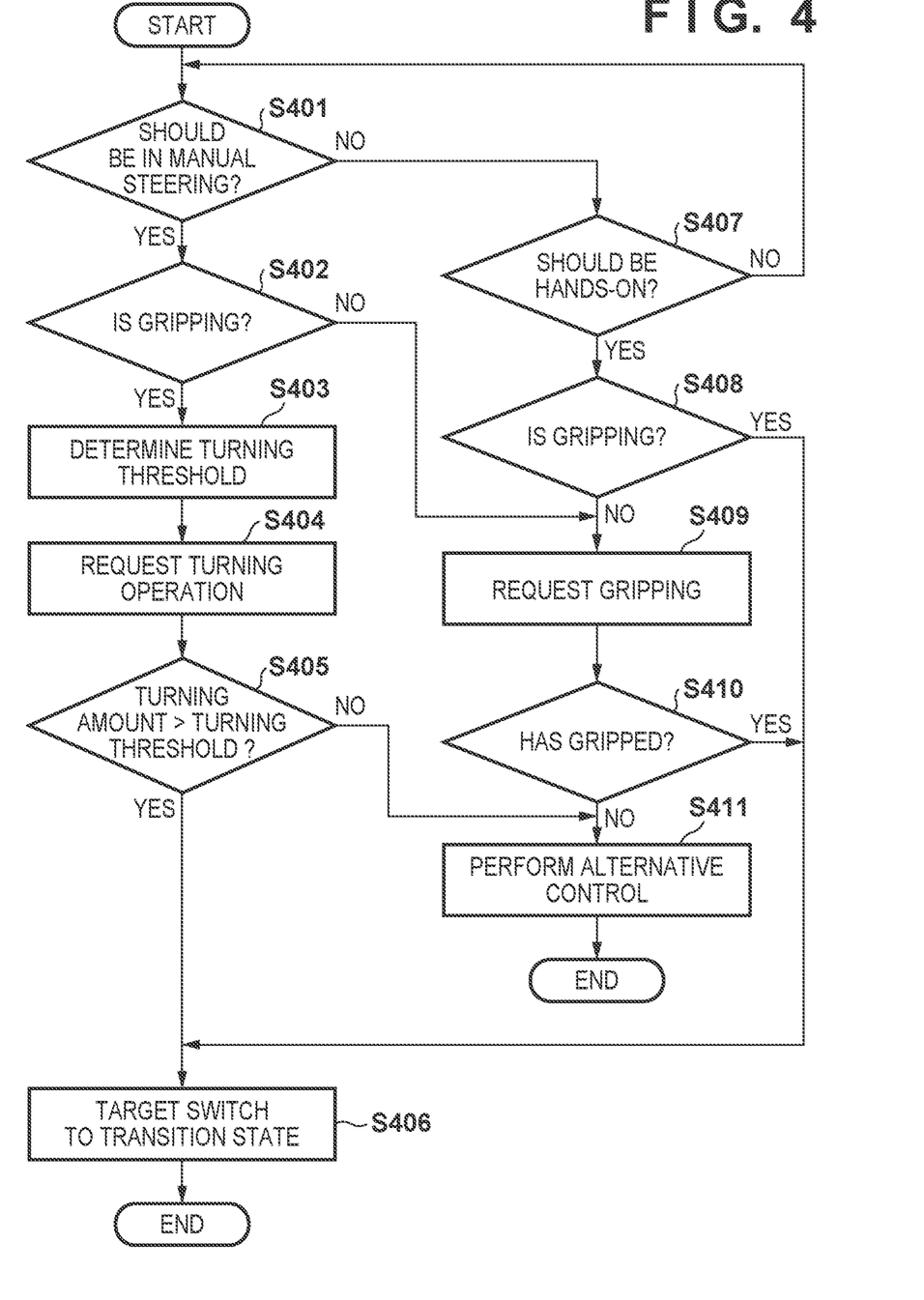
FIG. 4 is a flowchart illustrating an operation example of a control apparatus according to an embodiment.

Specifically, the processing related to gripping in steps S402, S408, S409, and S410 of FIG. 4 is replaced by processing related to peripheral monitoring. Moreover, the determination of whether or not to transition to the hands-on automatic steering state 302 in step S407 of FIG. 4 is replaced by determination of whether or not to transition to an eyes-on automatic steering state. Furthermore, if the driver is not gripping the steering wheel 31 at the time of execution of step S403, the control apparatus 2 may switch to manual steering on the condition of gripping the steering wheel 31. If the driver is gripping the steering wheel 31 at the time of the execution of step S403, the control apparatus 2 may switch to manual steering on the condition that the turning amount of the steering wheel 31 exceeds a turning threshold, as in steps S403 to S405.

Summary of Embodiments

<Item 1>

A control apparatus (2) of a vehicle (1) including a steering operator (31), the control apparatus (2) comprising:
   an environment detection unit (41 to 43) configured to detect a surrounding environment of the vehicle;
   a travel control unit (20) configured to execute automatic steering control based on the surrounding environment; and
   an operation detection unit (201, 202) configured to detect a first operation and a second operation by a driver;
wherein the travel control unit can take
   a first state (301) in which automatic steering control is not performed,
   a second state (302) in which automatic steering control is performed on condition of the second operation, and
   a third state (303) in which automatic steering control is performed without condition of the second operation, and the travel control unit transitions from the third state to the first state on condition of the first operation (step S405).

According to this item, the intention of the driver to transition to the first state in which the automatic steering control is not performed can be accurately determined.

<Item 2>

The control apparatus according to item 1, wherein the travel control unit transitions from the third state to the second state on condition of the second operation (step S410).

According to this item, the transition to the second state can be achieved merely by satisfying the condition of the second state.

<Item 3>

The control apparatus according to item 1 or 2, wherein the first operation is an operation of turning the steering operator, and the second operation is an operation of gripping the steering operator.

According to this item, a specific operation for the transition to the first state or the second state is defined.

<Item 4>

The control apparatus according to item 1 or 2, wherein the first operation is an operation of turning or gripping the steering operator, and
the second operation is an operation of looking outside the vehicle.

According to this item, a specific operation for the transition to the first state or the second state is defined.

<Item 5>

The control apparatus according to any one of items 1 to 4, wherein when it is determined that the third state should be transitioned to the first state while the second operation is being performed, the travel control unit transitions from the third state to the first state on condition of the first operation (step S402, step S405).

According to this item, when the driver is performing the second operation, the intention of the driver can be accurately determined.

<Item 6>

The control apparatus according to any one of items 1 to 5, wherein when it is determined that the third state should be transitioned to the first state (step S403), the travel control unit determines an operation amount of the first operation required for transition from the third state to the first state based on a shape of a road on which the vehicle is traveling.

According to this item, the amount of operation by the driver can be appropriately adjusted.

<Item 7>

A vehicle (1) comprising:
the control apparatus (2) according to any one of items 1 to 6.

According to this item, the above items are realized in the form of a vehicle.

<Item 8>

A program for causing a computer to function as the control apparatus according to any one of items 1 to 6.

According to this item, the above items are realized in the form of a program.

The invention is not limited to the foregoing embodiments, and various variations/changes are possible within the spirit of the invention.

What is claimed is:

1. A control apparatus of a vehicle including a steering operator, the control apparatus comprising:
an environment detection unit configured to detect a surrounding environment of the vehicle;
a travel control unit configured to execute automatic steering control based on the surrounding environment; and
an operation detection unit configured to detect a first operation of turning the steering operator by a driver and a second operation of gripping the steering operator by the driver;
wherein the travel control unit can take
a first state in which automatic steering control is not performed,
a second state in which automatic steering control is performed on condition of the second operation, and
a third state in which automatic steering control is performed without condition of the second operation, and
in a case where it is determined that the third state should be transitioned to the first state, the travel control unit:
determines whether the driver is performing the second operation;
in a case where it is determined that the driver is performing the second operation, transitions from the third state to the first state on condition that the driver performs the first operation; and
in a case where it is determined that the driver is not performing the second operation, transitions from the third state to the first state on condition that the driver performs the second operation.

2. The control apparatus according to claim 1, wherein when it is determined that the third state should be transitioned to the first state, the travel control unit determines an operation amount of the first operation required for transition from the third state to the first state based on a shape of a road on which the vehicle is traveling.

3. A vehicle comprising:
the control apparatus according to claim 1.

4. A non-transitory storage medium for storing a computer program for causing one or more processors to perform the operations of the control apparatus according to claim 1.

5. A control apparatus of a vehicle including a steering operator, the control apparatus comprising:
an environment detection unit configured to detect a surrounding environment of the vehicle;
a travel control unit configured to execute automatic steering control based on the surrounding environment; and
an operation detection unit configured to detect a first operation of turning or gripping the steering operator by a driver and a second operation of looking outside the vehicle by the driver;
wherein the travel control unit can take
a first state in which automatic steering control is not performed,
a second state in which automatic steering control is performed on condition of the second operation, and
a third state in which automatic steering control is performed without condition of the second operation, and
the travel control unit:
in a case where it is detected that the driver is performing the second operation, determines an operation amount of the steering operator in the first operation required for transition from the third state to the first state; and
transitions from the third state to the first state on condition that the driver performs the first operation and the second operation.

6. The control apparatus according to claim 5, wherein when it is determined that the third state should be transitioned to the first state while the driver is performing the second operation, the travel control unit transitions from the third state to the first state on condition that the driver performs the first operation.

7. The control apparatus according to claim 5, wherein when it is determined that the third state should be transitioned to the first state, the travel control unit determines an operation amount of the steering operator in the first operation required for transition from the third state to the first state further based on a shape of a road on which the vehicle is traveling.

8. A vehicle comprising:
the control apparatus according to claim 5.

9. A non-transitory storage medium for storing a computer program for causing one or more processors to perform the operations of the control apparatus according to claim 5.

* * * * *